United States Patent [19]

Colijn

[11] 4,265,956
[45] May 5, 1981

[54] SYNTHETIC NET MATERIAL

[75] Inventor: Johannes J. V. Colijn, Huttwil, Switzerland

[73] Assignee: Breveteam S.A., Fribourg, Switzerland

[21] Appl. No.: 927,943

[22] Filed: Jul. 25, 1978

[30] Foreign Application Priority Data

Aug. 10, 1977 [CH] Switzerland .................. 9791/77

[51] Int. Cl.³ ............................................. B32B 3/12
[52] U.S. Cl. ........................... 428/134; 264/DIG. 81;
264/146; 264/147; 428/116; 428/131; 428/136;
428/255
[58] Field of Search ............... 428/131, 134, 136, 910,
428/255, 116; 264/DIG. 47, 146, 147, DIG. 81

[56] References Cited

U.S. PATENT DOCUMENTS

| | | | |
|---|---|---|---|
| 3,505,157 | 4/1970 | Fields et al. | 428/156 |
| 3,790,652 | 2/1974 | Colijn et al. | 264/146 |
| 4,140,826 | 2/1979 | Liu | 428/910 |

FOREIGN PATENT DOCUMENTS

| | | |
|---|---|---|
| 922131 | 3/1963 | United Kingdom . |
| 1116181 | 6/1968 | United Kingdom . |
| 1120578 | 7/1968 | United Kingdom . |
| 1273451 | 5/1972 | United Kingdom . |
| 1378750 | 12/1974 | United Kingdom . |

Primary Examiner—George F. Lesmes
Assistant Examiner—E. Rollins Buffalow
Attorney, Agent, or Firm—Schwartz, Jeffery, Schwaab, Mack, Blumenthal & Koch

[57] ABSTRACT

A net formed from partially crystalline synthetic material is made by first forming a plurality of parallel rows of overlapping slits in a solid, biaxially oriented shrinkable sheet of plastic film, such as polypropylene. The sheet is heated to produce a film lattice through shrinkage and thereafter stretched in the longitudinal direction while maintained at a temperature below the crystalline melting point, thereby causing the web portions to be stretched into thin filaments while the intersection portions remain undrawn. The resulting net comprises rhomboid-shaped meshes defined by the filaments and intersections and is expandable in a direction transverse to the net by a multiple of the width of the net.

7 Claims, 4 Drawing Figures

SYNTHETIC NET MATERIAL

BACKGROUND OF THE INVENTION

1. Field of the Invention

The invention relates to devices used for protecting vegetable crops from damage by birds or other vegetable eating wild animals.

2. Description of the Prior Art

Conventional nets tied from filaments or yarn or nets extruded from monofilic plastic strands act as a sort of access block, i.e. they block access to the parts of plants located behind the net. This, however, does not prevent birds from causing considerable damage without slipping through the net. Small birds attempt to slip through, thereby making a very narrow mesh necessary. However, this raises the cost of making the nets. Wide mesh nets have the additional disadvantage that some animals become entangled in them and are unable to free themselves.

Attempts are being made, therefore, to design such protective devices so that they will have a frightening effect on animals, thereby causing them to avoid objects covered with such devices. Another possibility consists in camouflaging the sources of food so that the animals will no longer recognize them as such. A certain deterring effect may be achieved by means of the so-called bird deterrent bands. These are bands approximately 5-8 cm wide in brilliant colors, such as yellow, red or orange or made of shiny aluminum foil. The deterrent effect is present, however, in the immediate vicinity of the bands. The intervals or uncovered spaces between the bands are unprotected.

SUMMARY OF THE INVENTION

It is the object of the invention to provide a flat surface material having both a deterrent and a camouflaging effect, said material being producible relatively inexpensively, capable of covering large areas at minimum expense per unit area and is easily handled.

The process to produce the net according to the invention proceeds in new directions and provides improvements over known processes. A process is described in CH-PS 515.109 or Colijn et al U.S. Pat. No. 3,790,652 by which film nets with flat intersections or knots and webs may be produced from a solid film of a thermoplastic, invention proceeds in new directions and provides improvements overknown processes. A process is described in CH-PS 515.109 or Colijn et al U.S. Pat. No. 3,790,652 by which film nets with flat intersections or knots and webs may be produced from a solid film of a thermoplastic, partially crystalline synthetic material in a relatively simple and inexpensive manner. According to this process, a biaxially oriented film is provided with parallel rows of slits, with the slits mutually overlapping between two adjacent rows. As the result of a heat shrinking process, the material located adjacent to the individual slits contracts into knots and webs which are thicker than the original film, while simultaneously opening the slits. The result is a film net having excessive weight per unit area and relatively low strength in relation to its intended purpose. This patent, however, also teaches the option of executing the heat shrinking process while simultaneously expanding the slit sheet in order to selectively expand the openings created by the shrinking process. However, because of the combination of the expansion with the heat shrinking process, deformation takes place at a temperature far in excess of the fusing range of the plastic. At this temperature, no increase in strength results from the extension and the knots are also drawn which weakens them, so that the net created is unsatisfactory with respect to strength. This disadvantage is eliminated by the invention wherein the film net, shrunk and cooled after the heat shrinking process, is again heated to temperatures of from 40° C. to 50° C. below the crystallite melting point of the plastics material, and is stretched in the longitudinal direction. Because of the differential material distribution between the knots and the web, the alter is drawn into a thin mesh, while the knots remain essentially undrawn.

In the Fields et al U.S. Pat. No. 3,505,157 there is disclosed a net made of a thermoplastic synthetic material in which the knots of the mesh are not oriented, while the webs are oriented. The specific difference in strength between the oriented and disoriented material is equalized by the thickening of the mesh knots. The knots, however, are not concentrated in a flat configuration, but are instead in the shape of pearls so that the visible surface area of hte net is not optimal in relation to the weight per unit area.

BRIEF DESCRIPTION OF THE DRAWINGS

The invention shall be described by way of reference to the drawings wherein.

DETAILED DESCRIPTION OF THE PREFERRED EMBODIMENTS

Figure 1:
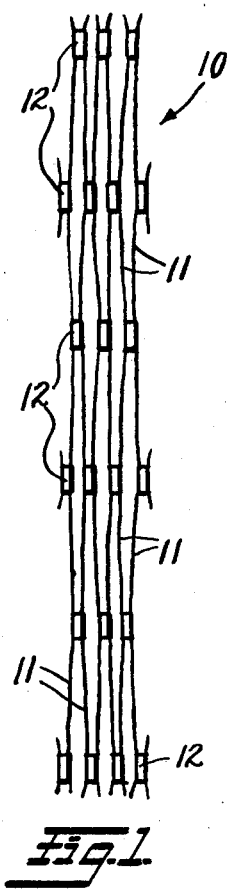
FIG. 1 is a top view of a net according to the invention in the unexpanded state.
Figure 2:
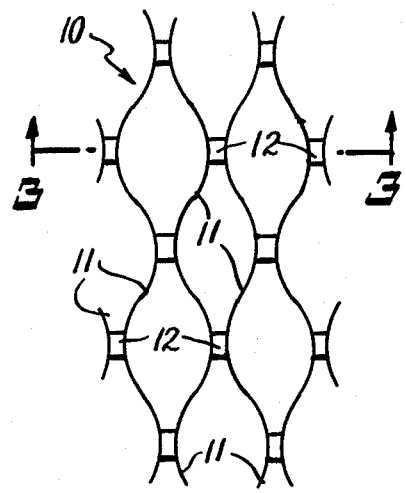
FIG. 2 is the net of FIG. 1 in the expanded state.

FIG. 1 represents the approximate state of the net when it is loosely placed on a table without the application of an external force. The mesh 10 of the net in this state form highly extended rhombi. The webs of the mesh are in the form of thin, highly extended filaments 11, while the intersections or knots 12 of the mesh are in the form of flat platelets. The net is preferably produced in the form of sheeting, whereby the mesh 10 is located advantageously parallel to the longitudinal direction of the sheet of the commercial product. The sheet may then be laterally expanded with the application of only a slight force. In the unexpanded state, the sheet may be wound in a compact form onto a core roll.

A particular characteristic of the net of the invention is the lamina shape of the knots 12. In relation to the filament-like web 11, the knots 12 offer a large visible area. The knots 12 are also very thin in relation to their area so that for a given amount of material of the web a maximum in surface area is produced. If a synthetic plastic material is used, the surface will reflect the light. With a relatively uniform distribution of the knots 12 over the surface area to be covered, such as produced by the optimum expansion of the net, the net will be visible from a large distance. This is particularly true when the plastic material is pigmented with a deterrent color covering, such as yellow, orange or red, or possibly even white. What is most important is the impression made by the net on a passing flock of birds. Because the ripening periods of fruit, berries, and the like in part coincide with the migration habits of birds, the harvests are decimated primarily by flocks of such migrating birds. It has been found that these birds do not settle on crops covered by nets according to the invention. Whether this is due to a deterrent effect or whether the birds do not recognize the supply of food available under the net, is evidently immaterial in view of the fact that the crop remains intact.

Figure 3:
FIG. 3 is a section through the net on line 3—3 in FIG. 2.

The deterrent action with respect to birds is further enhanced by the fact that the lamina of the knots 12 are rotated out of the plane of the net during the expansion of said net and that they then occupy extensively random orientation, as indicated in FIG. 3. For a bird passing overhead, this represents a highly disquieting image which acts as a deterrent. For this reason, it is not necessary to make the mesh small enough so as to prevent certain species of birds from slipping through the mesh.

Figure 4:
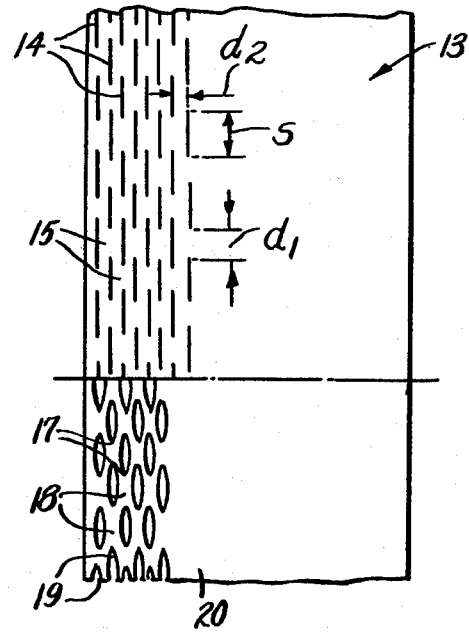
FIG. 4 schematically depicts two intermediate stages in the production process of the net according to the invention.

The production of an embodiment of a net according to the invention shall be hereinafter explained with reference to FIG. 4 by way of an example. The invention itself is, however, not restricted to the specific initial material or the process described.

For the example, a biaxially oriented sheet of film 13 of polypropylene was used. The film has a weight per unit area of approximately 270 g/m$^2$, corresponding to a thickness of approximately 0.3 mm. The film is provided with approximately 28,000 slits/m$^2$ with a slit length s of 8 mm. The slits 14 are arranged in aligned rows parallel to the longitudinal direction of the sheet of film 13, with $d_1$, the distance between the slits in the longitudinal direction being 4 mm and $d_2$, the distance between the slits in the transverse direction being 2.9 mm, whereby the slits 14 of two adjacent rows are offset with respect to each other so that their ends overlap. The sheet of film provided with slits in the manner described above is exposed to a heat shrinking process in a known manner in the direction of the sheet, under tensile stress. The plastic material shrinks in the process in the manner determined by the slits 14, whereby the area elements 15 between the ends of the slits in the same row constrict themselves into a flat intersection or knot lamina 17, while forming the openings 19. The result is a film net 20 with an opening cross section of approximately 50% and a hole density of approximately 11,000 per m$^2$, as indicated in the bottom section of FIG. 4.

The structure of the plastic material is characterized in a manner known to those skilled in the art by the following processes taking place subsequently to each other: orientation of the film, shrinking, cooling. The process and the film net are described in CH-PS 515.109 and Colijn et al U.S. Pat. No. 3,790,652. The film net is subsequently drawn by a drawing process in the known manner at a temperature (40°–50° C.) below the crystalline melting point of polypropylene, in the direction of the sheet. Because of the lesser mass or cross section of the filament shaped parts 18 as compared with the knot lamina 17, it is essentially the filaments 18 that are stretched, while the shape of the knot lamina 17 remains essentially unchanged.

In this manner, longitudinally extended meshes 10 in the form of rhombi are produced, with their four sides 11 having a length of approximately 45 mm. They have a cross-sectional area of approximately 0.08 mm$^2$ at their thinnest location. The lamina of the knots 12 have a thickness of approximately 0.350 mm, are 8 to 9 mm long and approximately 2 mm wide. The length of the mesh on a diagonal parallel to the longitudinal direction of the sheet under these conditions is about twice the length of the sides, while the diagonal in the transverse direction is negligibly small, as shown in FIG. 1. The sides 11 represent in pairs the continuation of the lamina of the knots 12 in the longitudinal direction of the sheet. The commercial sheet is rolled out with a width of approximately 1 m, at a weight per unit area of approximately 30–35 g/m$^2$.

During the placing of the net over the plant crop to be protected, the originally approximately 1 m wide sheet may be expanded to a width of approximately 8 m in the transverse direction, whereby the maximum is defined by the state in which the two diagonals of the mesh 10 are approximately equal. In actual use, however, the sheet will be extended only to about 5.5 to 6 m in width. Greater expansion offers little advantae because the loops are under stress so that the mesh may break and the parts of plants upon which the mesh is suspended are placed in danger of breaking. In case of an expansion of 5.5 to 6 times the orignal width, sufficient yield remains in the mesh to protect both the net and the plants when the wind agitates the latter. Due to the slight restoring force of the deflected sides of the mesh loops, the net conforms and attaches itself well to the physical configuration of the crops, particularly in the securing of the net against the trunk of plants over the ground.

The net spread in the manner described above contains approximately 450 to 550 knots lamina per m$^2$ of the covered surface, each having an area of approximately 17 mm$^2$ but weighing only 6 g/m$^2$. The lamina are widely visible, especially if the plastic material is colored yellow. The optical effect is enhanced additionally by the rotation of the knot lamina 12 from the plane of the net. This yields a maximum optical return in relation to the material consumed. The lowered weight per unit area translates into a reduced weight to be supported by the plants. Access to air and light is only negligibly affected.

The removal and destruction of the net is accomplished without difficulty. If necessary, additives may be incorporated in the plastic, such as, for example, means for protection against ultraviolet radiation, thereby retarding the disintegration of the net when exposed to the sun. Also, additives designed to provide the timed disintegration of the net following the harvest period may also be incorporated, thereby obviating the necessity of collecting the net thereafter.

The numerical data presented in the example of the embodiment described hereabove correspond to an example taken from a plurality of types of nets. They may vary within wide limits, e.g. with respect to the thickness of the original film, which may amount to between 50 and 500 g/m$^2$, the length of the sides of the mesh loops, which vary between 15 and 80 mm, the ara of the lamina of the knots which may vary between 5 and 25 mm$^2$. The ratio of the length of the mesh loop sides 11 to the length of themesh knots 12 advantageously may amount to between 5:1 and 8:1 and the ratio of the cross sections of the mesh sides 11 to the mesh knots 12 advantageously amounts to between 1:12 and 1:20.

In another actual example, the initial material consists of a biaxially oriented sheet of polypropylene film with a weight per unit area of approximately 180 g/m$^2$. It is provided with approximately 50,000 slits per m$^2$ with the dimensions of (FIG. 4.) s = 4.3 mm, $d_1$ = 3.0 mm and $d_2$ = 2.7 mm. The heat shrinking process and the subsequent 20.7.78 in the longitudinal direction are performed as in the preceding example. The sides 11 are approximately 30 mm long following the drawing. THe knots of the mesh 12 have an area of approximately 3×2.5 mm.

It has been found that the most favorable conditions for the conversion of the film into a net are present when the arrangement of the slits in such that the $d_2$ distances amount to a maximum of 3 mm, the slit length s to between 3 and 10 mm and the $d_1$ distances to about ½ to ⅔ of the slit length s.

What is claimed is:

1. An expandable net for protecting plant crops and formed from a length of partially crystalline synthetic material colored by means of an optically covering pigment comprising:

a mesh structure defined by a plurality configuration joined to a plurality of intersection portions of shrunk material having a flat configuration, said webs in an unexpanded condition of the net branching off in pairs from the intersection portions in the longitudinal direction with each pair of webs being substantially parallel and forming the sides of a plurality of rhomboid shapes with the intersection portions being disposed at the intersection of said rhomboid shapes.

2. The net of claim 1 wherein the synthetic material of said mesh structure includes polypropylene.

3. The net of claim 1 wherein:
   (a) the ratio of the length of each web of stretched material to the length of each intersection portion of the shrunk material is between approximately 5:1 to 8:1, and
   (b) the ratio of the cross section width of said web to the cross section width of each said intersection portion is between approximately 1:12 and 1:20.

4. The net of claim 1 wherein the net comprising said mesh structure is expandable in a transverse direction by an amount equal to at least three times the width of the net in an unexpanded condition.

5. The net of claim 4 wherein said mesh structure is expanded to display mesh loops having approximately the same area of expanse in the longitudinal and transverse directions.

6. The net of claim 1 wherein the surfaces of the flat intersection portions of shrunk material are substantially randomly oriented out of the general plane of the net comprising the webs of stretched material.

7. The net of claim 1 wherein said synthetic material is a thermoplastic synthetic material.

* * * * *

UNITED STATES PATENT AND TRADEMARK OFFICE
CERTIFICATE OF CORRECTION

PATENT NO. : 4,265,956
DATED : May 5, 1981
INVENTOR(S) : JOHANNES J. V. COLIJN

It is certified that error appears in the above—identified patent and that said Letters Patent is hereby corrected as shown below:

Column 1, line 43 through line 48, delete the following:

"A process is described in CH PS 515,109 or Colijn et al U.S.Pat.No. 3,790,652 by which film nets with flat intersections or knots and webs may be produced from a solid film of a thermoplastic, invention proceeds in new directions and provides improvements overknown processes."

Column 2, line 8, delete "crystallite" and insert --crystalline--.

Column 2, line 12, delete "alter" and insert --latter--.

Column 4, line 58, delete "themesh" and insert --the mesh--.

Column 5, line 1, delete "20.7.78" and insert --stretching--.

Column 5, line 3, delete "THe" and insert --The--.

Column 5, line 8, delete "in" and insert --is--.

Column 5, line 11, delete "theslit" and insert --the slit--.

Column 5, line 17, after "plurality" insert --of webs of stretched material having a generally filamentary--.

UNITED STATES PATENT AND TRADEMARK OFFICE
CERTIFICATE OF CORRECTION

PATENT NO. : 4,265,956
DATED : May 5, 1981
INVENTOR(S) : JOHANNES J. V. COLIJN

It is certified that error appears in the above—identified patent and that said Letters Patent is hereby corrected as shown below:

Column 6, line 1, delete "intersection" and insert --intersections--.

Column 6, line 10, after "of" second occurrence, insert --each--.

Signed and Sealed this

Fourth Day of August 1981

[SEAL]

Attest:

GERALD J. MOSSINGHOFF

Attesting Officer   Commissioner of Patents and Trademarks